(No Model.)
M. CONNELLY.
Process of Deodorizing and Refining Petroleum.
No. 240,093. Patented April 12, 1881.
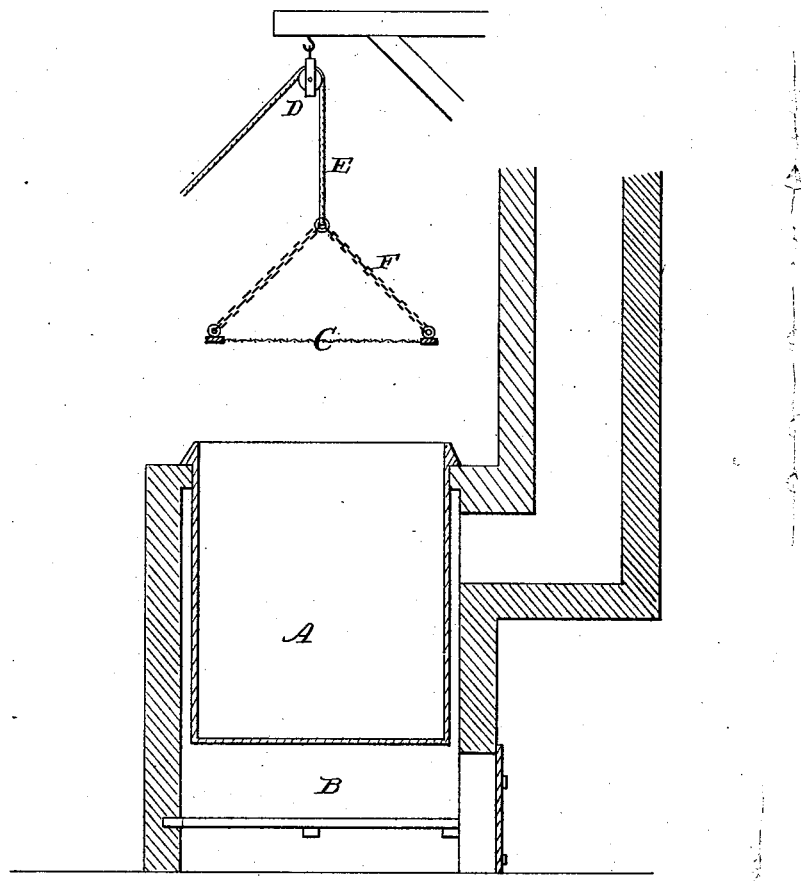
Witnesses:
H. A. Low
J. S. Barker.
Inventor:
Martin Connelly
by Doubleday and Bliss
Assoc. Attys

UNITED STATES PATENT OFFICE.

MARTIN CONNELLY, OF PHILADELPHIA, PENNSYLVANIA.

PROCESS OF DEODORIZING AND REFINING PETROLEUM.

SPECIFICATION forming part of Letters Patent No. 240,093, dated April 12, 1881.

Application filed February 15, 1881. (No model.)

*To all whom it may concern:*

Be it known that I, MARTIN CONNELLY, a citizen of the United States, residing at Philadelphia, in the county of Philadelphia and State of Pennsylvania, have invented certain new and useful Improvements in Processes of Deodorizing and Refining Petroleum; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

This invention relates to a novel method of deodorizing crude petroleum, and so preparing it that it can be used as a substitute for linseed-oil and other similar oils used in the arts and manufactures in which such oils are largely used.

Heretofore it has been customary to reduce and refine petroleum by heating it in vessels, (generally of the nature of stills or retorts,) and heating also therewith deodorizing agents introduced by pouring them directly into the oil. By these ordinary methods sediment always forms, and a tedious and expensive process of separation is necessary.

By my improved process, hereinafter described, I avoid entirely the formation of any sediment, and can complete the operation of purifying in a very short time. The deodorizing and purifying materials are introduced into and suspended within the oil in a vessel or holder arranged and supported independently of the vessel which holds the oil. By the avoiding of sediment I not only succeed in performing the operation of purifying in much less time than heretofore necessary, and with much less expense, but also obtain a very superior oil, as it is free from all foreign matters. It is practically impossible to produce a complete separation between the sediment (when formed) and the oil by decanting or otherwise withdrawing the latter.

In an open vessel of suitable size I place crude petroleum in the natural state in which it comes from the wells, and heat it gradually up to about 250° Fahrenheit, to remove the gaseous and lighter vaporous hydrocarbons and all the water, which latter is, as is well known, mixed, more or less, with the crude oil. I find it essentially necessary that all the water should be driven off, as will hereinafter more fully appear. After the petroleum has been sufficiently heated I then introduce the deodorizing and purifying materials, (preferably pure unslaked lime,) and continue raising the heat until it reaches about 350° Fahrenheit, and I keep the mass at this temperature for about three hours, more or less. After it has been heated sufficiently long I withdraw the lime and all the calcine products that have been formed, and the oil is then ready for use. The deodorizing material is introduced in a supporting vessel or holder apart from and independent of the vessel which holds the oil. Said supporting-vessel is of such construction as to give the oil free access to the deodorizing material that is suspended within it. After the oil has been subjected to the action of the deodorizing material sufficiently long, the latter is withdrawn in a body by lifting devices connected to the supporting vessel or holder, and thus, as will be seen, no sediment is formed, and it is not necessary to decant or draw off the oil in the now ordinary manner. By following this process I am enabled to complete the whole operation of deodorizing and purifying within three or four hours, and, moreover, the oil produced at the expiration of that time is of a very superior character for the purposes above described.

In the accompanying drawing there is shown a mechanism for the carrying out of my improved process.

In said drawing, A is an open caldron or kettle, which may be of any preferred style or size, mounted over a fire-place, B, in any suitable manner. In this the oil is placed and heated, as hereinbefore described, until the proper time for introducing the deodorizing material. Said material is then introduced by placing it upon a wire support, C, arranged in any suitable manner, to permit it to be readily raised or lowered, as by means of a pulley, D, through which passes a rope, E, connected to the support C by means of wires or chains F, of suitable length. With these devices the deodorizing material can be made to pass through the entire body of the oil, and also can be so suspended as to avoid the necessity of mixing and agitating them with the oil, the support C being less in diameter than the caldron A, and being held at a short distance from the bottom thereof while the deodorizing material is being suspended therein.

In this application I do not make claim to any other features than those specifically set forth in the following claim, as I prefer to claim all other patentable features in another application heretofore filed, of which this is a division.

What I claim is—

The herein-described process of deodorizing crude petroleum, it consisting in heating the petroleum in an open vessel, and in suspending the deodorizing materials in a solid state in the oil, and heating together the oil and said suspended materials, and afterward withdrawing the said deodorizing materials in a body from the oil.

In testimony whereof I affix my signature in presence of two witnesses.

MARTIN CONNELLY.

Witnesses:
SMITH R. TREADWELL,
HARRY E. KAUFMANN.